United States Patent
Sobczak et al.

(10) Patent No.: US 9,481,807 B2
(45) Date of Patent: Nov. 1, 2016

(54) ACRYLIC REDISPERSIBLE POLYMER POWDER FOR NON-CEMENTITIOUS EXTERIOR FINISHING COMPOSITIONS

(71) Applicants: Dow Global Technologies LLC, Midland, MI (US); Rohm and Haas Company, Philadelphia, PA (US)

(72) Inventors: Jeffrey J. Sobczak, Coatesville, PA (US); Diane M. Vaessen, Schwenksville, PA (US); Mark D. Westmeyer, Collegeville, PA (US); William J. Fabiny, Harleysville, PA (US)

(73) Assignees: Rohm and Haas Company, Philadelphia, PA (US); Dow Global Technologies LLC, Midland, MI (US)

( * ) Notice: Subject to any disclaimer, the term of this patent is extended or adjusted under 35 U.S.C. 154(b) by 0 days.

(21) Appl. No.: 14/653,014

(22) PCT Filed: Dec. 12, 2013

(86) PCT No.: PCT/US2013/074554
§ 371 (c)(1),
(2) Date: Jun. 17, 2015

(87) PCT Pub. No.: WO2014/099574
PCT Pub. Date: Jun. 26, 2014

(65) Prior Publication Data
US 2015/0337158 A1 Nov. 26, 2015

Related U.S. Application Data

(60) Provisional application No. 61/738,604, filed on Dec. 18, 2012.

(51) Int. Cl.
| | |
|---|---|
| *C09D 133/12* | (2006.01) |
| *C08K 3/00* | (2006.01) |
| *C08K 5/00* | (2006.01) |
| *B05D 3/02* | (2006.01) |
| *C08J 3/02* | (2006.01) |
| *C08J 3/03* | (2006.01) |
| *C08F 2/22* | (2006.01) |
| *C08J 3/12* | (2006.01) |
| *C08J 3/16* | (2006.01) |
| *C08F 265/06* | (2006.01) |
| *C04B 26/06* | (2006.01) |
| *C08F 2/00* | (2006.01) |
| *C08F 220/18* | (2006.01) |
| *C09D 151/00* | (2006.01) |
| *C04B 103/00* | (2006.01) |
| *C04B 111/00* | (2006.01) |
| *C04B 111/10* | (2006.01) |

(52) U.S. Cl.
CPC ............. *C09D 133/12* (2013.01); *C04B 26/06* (2013.01); *C08F 2/001* (2013.01); *C08F 2/22* (2013.01); *C08F 220/18* (2013.01); *C08F 265/06* (2013.01); *C08J 3/02* (2013.01); *C08J 3/03* (2013.01); *C08J 3/12* (2013.01); *C08J 3/126* (2013.01); *C08J 3/16* (2013.01); *C08K 3/0041* (2013.01); *C08K 5/005* (2013.01); *C08K 5/0083* (2013.01); *C09D 151/003* (2013.01); *C04B 2103/0057* (2013.01); *C04B 2103/0058* (2013.01); *C04B 2103/0065* (2013.01); *C04B 2111/00482* (2013.01); *C04B 2111/1037* (2013.01)

(58) Field of Classification Search
None
See application file for complete search history.

(56) References Cited

U.S. PATENT DOCUMENTS

| | | |
|---|---|---|
| 5,403,894 A | 4/1995 | Tsai et al. |
| 5,739,179 A | 4/1998 | Chiou et al. |
| 5,872,189 A | 2/1999 | Bett et al. |
| 5,908,877 A | 6/1999 | Ci et al. |
| 6,228,937 B1 | 5/2001 | Eck et al. |
| 6,288,174 B1 | 9/2001 | Ikegami et al. |
| 6,559,236 B1 | 5/2003 | Willimann et al. |
| 6,624,243 B2 | 9/2003 | Stark et al. |
| 2012/0007529 A1 | 1/2012 | Kim et al. |

FOREIGN PATENT DOCUMENTS

| | | | |
|---|---|---|---|
| EP | 0522791 A1 | 1/1993 | |
| EP | 0721004 A2 | 7/1996 | |
| EP | 0758658 A2 | 2/1997 | |
| WO | 2013134208 A1 | 1/1993 | |
| WO | WO 2013134208 A1 * | 9/2013 | ......... C04B 24/2641 |

* cited by examiner

Primary Examiner — Vu A Nguyen
(74) Attorney, Agent, or Firm — Andrew E. C. Merriam

(57) ABSTRACT

The present invention provides a water redispersible polymer powder (RDP) for use in the preparation of non-cementitious exterior finishing compositions such as textured paint formulations. Also provided are non-cementitious exterior finishing compositions comprising such RDPs and a method of coating a surface with such a finishing composition. When the RDP of the invention is incorporated into an exterior finishing composition such as a topcoat formulation of an external insulation finishing system (EIFS), the resultant composition provides improved dirt pickup resistance without a loss in wet abrasion resistance over conventional textured paint formulations comprising acrylic latex powders and, preferably, acrylic latexes.

6 Claims, No Drawings

ACRYLIC REDISPERSIBLE POLYMER POWDER FOR NON-CEMENTITIOUS EXTERIOR FINISHING COMPOSITIONS

The present invention relates to water redispersible polymer powders. In particular, the present invention relates to a water redispersible polymer powder (RDP) which is suitable for use as an additive in non-cementitious exterior finishing compositions such as a textured paint, e.g. a topcoat in a multi-layered exterior wall system. Also provided are aqueous exterior finishing compositions comprising such an RDP, and dry mix precursors thereof. A method in which the aqueous exterior finishing composition of the present invention is applied to a surface, e.g. a vertical surface, and dried or allowed to dry is also provided.

BACKGROUND

A wide variety of RDPs, which may be made by spray drying an emulsion polymer in the presence of various additives such as a protective colloid and anti-caking agent, are well known in the art and are available from commercial sources. Examples of conventional RDPs, together with processes for manufacturing such compositions, include those disclosed in U.S. Pat. Nos. 5,403,894, 5,739,179, 6,559,236 and 6,624,243.

Multi-layered exterior wall systems such as exterior insulation and finish systems (EIFS) are used extensively as exterior wall surfaces in commercial and residential buildings. Such multi-layered systems are conventionally prepared by covering a substrate such as plywood or gypsum board with a layer of insulation material, covering the insulation material with a cementitious basecoat which is embedded with a reinforcing mesh and finishing with a non-cementitious topcoat or exterior finishing composition which is typically applied with a trowel to form a layer with a thickness of from 0.1 to 2.5 cm. Such exterior finishing compositions not only provide insulation but also act as a barrier to moisture ingress and provide a decorative function. Therefore, to be suitable for exterior application, such topcoat or finishing compositions need to have good exterior durability, including good colour retention, dirt pickup resistance, water resistance and abrasion resistance.

Conventional exterior finishing compositions or textured paints typically contain a film-forming polymer to bind the pigments and extenders together into a tough, durable coating. Consequently, such finishing compositions are typically supplied as a wet mix because the polymer itself is supplied in an aqueous form. However, in order to simplify transportation and eliminate freeze-thaw issues associated with liquid materials, the polymer may be transported in dry form and combined with other dry components of the finishing composition to form a dry mix formulation to which water may be added at the point of use.

The use of RDP binder compositions in external finishing compositions is disclosed, for example, in EP-A-0721004 which provides a RDP composition for use in water-resistant films and coatings. The RDP comprises a polymer containing carboxyl, hydroxyl, carboxylamide or amine functionality and a reactive component that forms a non-ionic bond with said polymer functional group following dispersion of the admixture in water. Further examples of RDP-containing external finishing compositions can be found in WO-A-2012/007529 and U.S. Pat. No. 6,228,937.

However, although the provision of such dry mix formulations is advantageous with regard to transportation, it has been found that textured paints prepared in this way using commercially available acrylic RDPs, e.g. DRYCRYL™ DP-2903 (a 100% acrylic RDP having a Tg of +10° C. commercially available from the Dow Chemical Company, USA), provide reduced performance, specifically dirt pick up resistance and/or wet abrasion resistance, compared with textured paints prepared from liquid polymers, e.g. RHOPLEX™ EI-2000 (a 100% acrylic polymer latex having a Tg of +12° C., commercially available from the Dow Chemical Company, USA), which is specifically designed for use in exterior finishing compositions and provides colourfastness and dirt pick up resistance in EIFS topcoat formulations.

It is therefore an object of the present invention to provide a water-redispersible polymer powder (RDP) that, when incorporated into a external finishing composition such as a topcoat formulation of an external insulation finishing system (EIFS), provides improved dirt pickup resistance without a loss in wet abrasion resistance (which is considered to be an early indicator of exterior durability) over conventional textured paint formulations comprising acrylic latex powders and, preferably, acrylic latexes. Preferably, the external finishing composition provides an improvement in both dirt pickup resistance and wet abrasion resistance over conventional textured paint formulations comprising acrylic latex powders and, even more preferably, over those comprising acrylic latexes.

STATEMENT OF THE INVENTION

The present invention in its various aspects is as set out in the accompanying claims.

According to a first aspect, the present invention provides a redispersible polymer powder (RDP) comprising a carboxyl group containing multi-stage acrylic copolymer having: an alkali-soluble resin outer stage and one or more inner stage(s); a nucleating agent having a boiling point of 150° C. to 500° C. and a water solubility of 3.5 or less; and a colloidal stabilizer, wherein, when dispersed in water, said one or more inner stage comprises an acrylic (co)polymer having a glass transition temperature (Tg), calculated using the Fox equation, of from −40 to 50° C., and wherein the weight ratio of said alkali-soluble resin outer stage to said one or more inner stage(s) is from 1:19 to 2:3.

According to a second aspect, the present invention provides a non-cementitious dry mix formulation for use in an exterior finishing composition, said dry mix formulation comprising, based on the total weight of the dry formulation and from 40 to 80 wt. % of an aggregate material and from 3 to 30 wt. % of a RDP according to the first aspect of the present invention.

According to a third aspect, the present invention provides a non-cementitious exterior finishing composition comprising the dry mix formulation of the second aspect of the invention and water.

According to a fourth aspect, the present invention provides a method of coating a surface with an exterior finishing composition, said method comprising: applying on said surface an exterior finishing composition according to the third aspect of the invention; and drying or allowing to dry said exterior finishing composition.

DETAILED DESCRIPTION OF THE INVENTION

Throughout the specification, any reference to percent or percent weight etc. is expressed in terms of dry weight of the composition unless otherwise specified. Further, all ranges recited in the specification are inclusive and combinable.

Unless otherwise indicated, all temperature and pressure units are room temperature and standard pressure (STP). All ranges are inclusive and combinable.

All phrases comprising parentheses denote either or both of the included parenthetical matter and its absence. For example, the phrase "(meth)acrylate" includes, in the alternative, acrylate and methacrylate.

As used herein the term "acrylic" refers to polymers that comprise the polymerization product of monomer mixtures containing more than 50 wt. %, based on total monomer solids, of any acrylic monomers such as, for example, acrylates, methacrylates, (meth)acrylamides, and (meth) acrylic acids.

As used herein, unless otherwise indicated, the phrase "average particle size", of a water redispersible polymer powder particle refers to the particle diameter or the largest dimension of a particle in a distribution of powder particles as determined by laser light scattering such that 50 wt. % of the particles in the distribution are smaller than the particle and 50 wt. % of the particles in the distribution are larger than the particle. For redispersed particles, the particle size distribution was measured using a Coulter™ LS 230 particle size analyzer (Beckman Coulter, Brea, Calif.) per manufacturer's recommended Procedures via laser scattering. The scattering light from particles through laser scattering and polarization intensity differential scattering is collected as a function of angle, and subsequently converted to a particle size distribution.

As used herein, unless otherwise indicated, the term "average particle size" for latex or emulsion particles refers to a weight average particle size measured via dynamic light scattering using a Brookhaven Instruments Corporation 90PLUS™ Particle Size Analyzer (Holtsville, N.Y.) per manufacturer's recommendations.

"Glass transition temperature" or "$T_g$" is the glass transition temperature of a copolymer calculated using the Fox equation [Bulletin of the American Physical Society 1, 3 Page 123 (1956)] as follows:

$$1/T_g = w_1/T_{g(1)} + w_2/T_{g(2)}$$

For a copolymer, $w_1$ and $w_2$ refer to the weight fraction of the two monomers, based on the weight of monomers charged in the reaction vessel, and $T_{g(1)}$ and $T_{g(2)}$ refer to the glass transition temperatures of the two corresponding homopolymers in degrees Kelvin. For polymers containing three or more monomers, additional terms ($w_n/T_{g(n)}$) are added. The glass transition temperatures of the homopolymers for the purpose of this invention are those reported in "Polymer Handbook", edited by J. Brandrup and E. H. Immergut, Interscience Publishers, 1966, unless that publication does not report the $T_g$ of a particular homopolymer, in which case the $T_g$ of the homopolymer is measured by differential scanning colorimetry (DSC). To measure the glass transition temperature of a homopolymer by DSC, the homopolymer sample is prepared and maintained in the absence of ammonia or primary amine. The homopolymer sample is dried, preheated to 120° C., rapidly cooled to −100° C., and then heated to 150° C., at a rate of 20° C./minute while data is collected. The glass transition temperature for the homopolymer is measured at the midpoint of the inflection using the half-height method.

As used herein, unless otherwise indicated, the phrase "molecular weight" refers to the weight average molecular weight as measured by gel permeation chromatography (GPC) against a poly(styrene) standard.

As used herein, the term "polymer" refers, in the alternative, to a polymer made from one or more different monomer, such as a copolymer, a terpolymer, a tetrapolymer, a pentapolymer etc., and may be any of a random, block, graft, sequential or gradient polymer. Thus, the term "polymer" includes copolymers and polymers within its scope.

As used herein, the terms "water redispersible polymer powder", "redispersible polymer powder" and "RDP" are used interchangeably and refer to a polymer-containing powder which may readily be dispersed into deionized water to provide a particle size distribution of the original particle size of the latex or emulsion polymer used to make the powder.

As used herein, the term "substantially free of surfactants" means a composition that contains less than 5000 ppm of surfactant, based on the total weight solids of the composition, or, preferably, less than 2500 ppm.

As used herein, the term "water solubility" refers to the amount of a given material that visibly dissolves in water at room temperature, expressed as a percentage of the total weight or mass of water used. So, for example, if 5 grams of a material would dissolve in 100 g of water, the water solubility of that material is 5%.

The term "non-cementitious" refers to compositions which are substantially free of calcium silicate containing materials which react with water and harden to produce a water insoluble material. As used herein, the term "substantially free" means less than 5 wt. %, preferably less than 2 wt. %, and more preferably less than 1 wt. %, based on the total weight of the exterior finishing composition.

As used herein, the phrase "wt. %" stands for weight percent and is expressed in terms of dry weight unless otherwise specified.

The RDP of the present invention comprises a colloidal stabilizer. Preferably, the RDP comprises a colloidal stabilizer in an amount from 0.1 to 30 wt. %, and more preferably in an amount from 2.0 to 10.0 wt. %, based on the total dry weight of the RDP.

Preferably, to avoid the use of excess surfactant, at least a portion of the total amount of colloidal stabilizer within the RDP is present during polymerization of the carboxyl group-containing multi-stage acrylic copolymer. Indeed, it is preferred that the total amount of colloidal stabilizers included within the RDP is added during polymerization of the carboxyl group-containing multi-stage acrylic copolymer. Preferably, the RDP comprises a colloidal stabilizer in an amount from 0.05 to 15 wt. %, based on the total weight of monomer solids. More preferably, the colloidal stabilizer is added in an amount from 0.1 to 10 wt. %, even more preferably from 2.0 to 4.0 wt. %. Anionic and non-ionic surfactants may also be used in polymerization in amounts of less than 0.5 wt. % of the total water redispersible polymer powder solids.

Preferably, the colloidal stabilizer used in the present invention is selected from: polyvinyl alcohols (PVOH) of various known molecular weights and degrees of hydrolysis, e.g. partially hydrolysed polyvinyl alcohols; chelating agents, such as, for example, ethylenediamine tetraacetate; polyacrylamides; polyvinylpyrrolidones; polysaccharides; polyvinyl sulfonic acid, cellulose; cellulose ethers; polyesters; and mixtures thereof. Most preferably the colloidal stabilizer is PVOH.

The RDP of the present invention comprises a nucleating agent. Suitable nucleating agents include any compound having a boiling point of at least 150° C., preferably at least 200° C., and a maximum of 500° C., preferably a maximum of 400° C., and a water solubility of 3.5% or less, preferably 1.0% or less, more preferably 0.5% or less. However, to ensure that the nucleating agent is within the RDP, the nucleating agent should not be volatile under the RDP processing conditions. Preferably, the total amount of nucleating agent within the RDP is present during polymerization of the carboxyl group-containing multi-stage acrylic copolymer. Preferably, the acrylic copolymer comprises from 0.1 to 4.0 wt. %, more preferably from 0.5 to 3.0 wt. %, still more preferably from 1.0 to 2.0 wt. % of the nucleating agent(s). These nucleating agents are preferably included during the first stage of copolymerisation of the multi-stage carboxyl-group containing acrylic polymer or prior to or during polymerising to form the alkali soluble resin stage. Nucleating agents are preferably used instead of surfactants during copolymerisation to improve redispersibility.

Preferably, the nucleating agent is selected from $C_3$ to $C_{10}$ alkyl glycol ethers; phenyl glycol ethers, such as ethylene glycol phenyl ether; $C_3$ to $C_{10}$ alkyl diglycol ethers, such as dipropylene glycol n-butyl ether; $C_3$ to $C_{10}$ alkylaryl glycol ethers, such as ethylene glycol octylphenyl ether; $C_3$ to $C_{10}$ alkylaryl diglycol ethers, such as dipropylene glycol butylphenyl ether; $C_3$ to $C_{10}$ alkyl esters of $C_3$ to $C_9$ alkanoic acids, such as alkyl isobutyrates and branched alkyl isobutyrates, like 2,2,4-trimethyl-1,3-pentanediol monoisobutyrate; $C_3$ to $C_{10}$ alkyl esters of $C_3$ to $C_9$ alkanedioic acids, such as butyl succinate; $C_3$ to $C_{10}$ alkyl diesters of $C_3$ to $C_9$ alkanoic acids, such as 2,2-dimethyl-1-methylethyl-1,3-propanediyl bis-2-methyl propionate; and $C_3$ to $C_{10}$ dialkyl esters of $C_3$ to $C_9$ alkanedioic acids, such as diisobutyl glutarate, diisobutyl succinate, diisobutyl adipate; and mixtures thereof. More preferably, the nucleating agent is selected from linear or branched alkyl isobutyrates. Examples of suitable nucleating agents are shown in Table 1 below.

TABLE 1

| Nucleating Agent | BP (° C.) | $H_2O$ Solubility |
|---|---|---|
| 2,2-dimethyl-1-methylethyl-1,3-propanediyl bis-2-methyl propionate | 344 | Negligible |
| diisobutyl glutarate (55-65%); diisobutyl succinate (15-25%); diisobutyl adipate (10-25%) | 274-289 | Negligible |
| ethylene glycol phenyl ether (DALPAD ™, [1] A) | 244 | 2.5% |
| ethylene glycol phenyl ether (DOWANOL ™, [1] EPh) | 244 | 3.1% |
| 2,2,4-trimethyl-1,3-pentanediol monoisobutyrate | 254 | 0.1% |
| propylene glycol phenyl ether | 243 | 2.0% |
| dipropylene glycol n-butyl ether | 230 | 4.5% |
| ethylene glycol octylphenyl ether | 250 | Negligible |

[1] Dow Chemical Co., Midland, MI

The RDP of the present invention comprises a carboxyl group containing multi-stage acrylic copolymer having an alkali-soluble resin outer stage and one or more inner stage(s). Preferably, the acrylic copolymer also contains a nucleating agent and/or a colloidal stabilizer as described above.

Preferably, the multi-stage acrylic copolymer comprises, in polymerized form, from 0.1 to 20 wt. %, based on the total weight of monomers used to make said copolymer, of one or more carboxyl containing monomer. More preferably, the copolymer comprises from 0.5 to 5.0 wt. %, still more preferably, from 1.0 to 3.5 wt. % of one or more carboxyl containing monomer. Suitable carboxyl containing monomers include acrylic acid, methacrylic acid, itaconic acid, maleic acid, fumaric acid, acrylic anhydride, methacrylic anhydride, half esters of maleic anhydride/fumaric/itaconic, maleic anhydride, and itaconic anhydride. Preferably, the carboxyl containing monomer is (meth)acrylic acid.

The multi-stage acrylic copolymer comprises an alkali-soluble resin outer stage and one or more inner stage(s). When disposed in water, the inner stage comprises an acrylic (co)polymer having a glass transition temperature (Tg), calculated using the Fox equation, of from −40 to 50° C., preferably from −30 to 35° C., more preferably from −20 to 25° C., and, still more preferably from −10 to 20° C.

The relative proportion, expressed in terms of a weight ratio, of the alkali-soluble resin outer stage to the one or more inner stage(s) is from 1:19 to 2:3. Preferably, the weight ratio of the alkali-soluble resin outer stage to the one or more inner stage(s) is from 1:19 to 1:4, still more preferably from 1:19 to 3:17.

The multi-stage acrylic copolymer forms a core/shell structure in water with the alkali-soluble resin stage located on the outside of the polymer particle, either as a result of grafting or physiadsorption. Thus, the carboxyl groups in the copolymer are located at the surface of the redispersible copolymer powder particles. The inclusion of a nucleating agent helps to ensure coverage of the inner stage(s) of the multi-stage acrylic copolymer particle with the alkali soluble resin and, thus, improves the colloidal stabilization of the core. In addition, reducing or eliminating the surfactant requirement from the multi-stage copolymer production enables a relatively larger particle size alkali soluble resin which helps to colloidally stabilize the inner stage(s) of the acrylic copolymer in the RDP.

The multi-stage acrylic copolymers are produced using conventional emulsion copolymerisation techniques, such as is described in U.S. Pat. No. 5,403,894, except that copolymerization to from the alkali soluble resin takes place in the presence of a nucleating agent and, preferably, in a polymerization mixture that is substantially free of surfactants. Conventional thermal polymerization initiators such as persulfate salts, and/or redox initiators, such as peroxides with bisulfite salts may be used.

In general, two copolymerization techniques may be used; and all but one polymerization stage comprises a polyfunctional monomer to graft together the polymer stages. Technique one comprises emulsion polymerizing a monomer mixture of an ethylenically unsaturated carboxylic acid or anhydride and one or more non-ionic monomer, such as an alkyl(meth)acrylate, styrene, alkyl substituted styrene, (meth)acrylamide, or hydroxyalkyl(meth)acrylate, in the presence of a polyfunctional monomer to form an alkali soluble resin, neutralizing the alkali soluble resin with an amine base and, in a second stage, forming a monomer mixture of one or more non-ionic monomer, combining the second-stage monomers with the alkali soluble resin and polymerizing the monomer mixture to form the copolymers of the present invention. In one variation of this technique, the polyfunctional monomer is part of the second stage monomer mixture, not the monomer mixture that forms the alkali soluble resin, and is polymerized in the presence of the neutralized alkali soluble resin to form the inner stage polymer.

A second polymerization technique, as described in U.S. Pat. No. 4,916,171, comprises emulsion polymerizing a monomer mixture of one or more non-ionic monomer in the presence of a polyfunctional monomer to form an inner stage polymer and, in a subsequent stage, forming a monomer mixture of an ethylenically unsaturated carboxylic acid or anhydride and one or more nonionic monomer and combining the monomer mixture with the inner stage and polymerizing the mixture to form the copolymer. So long as there is one alkali soluble resin stage, additional nonionic monomer stages may be copolymerized along with the addition of a polyfunctional monomer to make multi-stage copolymers. In polymerization, the temperature in each stage may range from 20 to 105° C., or, preferably from 50 to 95° C.

The resulting weight ratio of the total solids of the one or more nonionic or inner stage copolymers to the alkali soluble resin polymer may range from 19:1 to 3:2, or, preferably 19:1 to 1:4, or, more preferably, from 19:1 to 3:17. In any polymerization, the initial stage may be formed by seed polymerization according to conventional methods.

Suitable non-ionic monomers for the preparation of the multi-stage acrylic copolymers may be chosen from ethyl acrylate, butyl acrylate, 2-ethylhexyl acrylate, methyl methacrylate, ethyl methacrylate, butyl methacrylate, methylolated (meth)acrylamide and methyl methacrylamide, hydroxyethyl(meth)acrylate. Nonionic monomers should comprise 5 wt. % or less of any hydroxyalkyl or methylolated monomer or amide group containing monomer. The ordinary skilled artisan knows how to select nonionic monomers that give a polymer stage having a desired Tg.

Suitable polyfunctional monomers may be from (a) multi-ethylenic monomers having two or more sites of unsaturation, such as, for example, allyl-, methallyl-, vinyl-, dicyclopentenyl and crotyl-esters of acrylic, and methacrylic acids, divinyl benzene, (poly)glycol di(meth)acrylates, such as, diethyleneglycol dimethacrylate; and polyol poly(meth) acrylates, such as trimethylolpropane trimethacrylate; (b) reactive chain transfer agents having two or more abstractable atoms, such as, for example, bromotrichloromethane; bromoform; carbon tetrachloride; and carbon tetrabromide; and (c) hybrid polyfunctional monomers having one or more sites of unsaturation and one or more abstractable atoms, such as, for example, allyl-, methallyl-, and crotyl-mercaptan; vinyl ethers and vinyl thioethers of cycloalkenols and cycloalkene thiols. Preferred polyfunctional monomers include allyl or methallyl(meth)acrylate, N-methallyl vinyl-amides of acrylic acid and methacrylic acid; and allyl-mercaptan. Useful amounts of polyfunctional monomers range from 0.01 to 5 wt. %, based on the total weight of monomers in the monomer mixture in which they are used, or, preferably, from 0.25 to 3.0 wt. %.

The RDP of the present invention may comprise other polymers blended with the carboxyl-group containing multi-stage acrylic copolymer. Such other polymers may be, for example, any nonionic (co)polymer, such as a polyolefin, olefin-vinyl ester, for example, ethylene-vinyl acetate, alkyl (meth)acrylates, styrene, or styrene acrylic copolymers. The blends may comprise from 20 to 80 wt. %, or, preferably, from 30 to 70 wt. % or, more preferably, from 40 to 60 wt. % of such nonionic (co)polymers, based on total polymer solids in the RDP.

The RDP of the present invention may comprise polymers that are the addition copolymerisation product of from 0.001 to 5 wt. %, based on the total weight of monomers used to make the copolymer, or, preferably, 0.1 to 1.0 wt. % of a silyl group containing monomer, such γ-methacryloyloxypropyl trimethoxy silane or vinyl trialkoxy silanes or a benzophenone containing monomer, such as vinyl benzophenone.

Preferably, the RDP further comprises an anti-caking agent. If present, the total amount of anti-caking agent included in the RDP is from 3.0 to 30.0 wt. %, preferably from 8.0 to 15.0 wt. %, based on the total dry weight of the RDP. Preferably, the anti-caking agent is selected from kaolin clay, alumina silicate, dolomite, calcium carbonate, dolomite, silicate minerals and blends thereof. More preferably, the anti-caking agent is selected from kaolin clay, alumina silicate and combinations thereof. Preferred alumina silicates are MINEX™ Industrial Grade Nos. 16 to 60, i.e. compositions comprising silicon dioxide, aluminium oxide, iron oxide and sodium oxide, calcium oxide, magnesium oxide and sodium oxide having a mesh particle size of less than 1.18 mm (#16), preferably less than 150 μm (#60).

In addition, the RDP may comprise other conventional additives such as, for example, an antifoaming agent, which is typically present in an amount of up to 1.5 wt. %, based on total solids. Other additives that may be employed, in conventional amounts, include one or more salts, such as $CaCl_2$, $MgCl_2$, monosaccharides, disaccharides, dispersants or superplasticizers.

Preferably, to increase the water redispersibility of the water redispersible polymer powders, a basic compound can be added prior to substantially drying the aqueous copolymer dispersion. The basic compound may be added before, during or after polymerization in an amount of 0.4 moles or more, preferably from 0.5 to 2 moles, more preferably 0.6 moles or more per mole of carboxylic groups in the copolymer. The basic compound can be added in such an amount to adjust the pH of the aqueous copolymer product to 8.0 or more, or 9.5 or more, or, preferably at least 10.5, and preferably up to 12.5. The basic compound may be an inorganic basic compound, preferably a strong inorganic basic compound, such as an alkali metal hydroxide or an alkaline earth metal hydroxide, such as calcium hydroxide, magnesium hydroxide, sodium hydroxide or potassium hydroxide.

The average particle size of the RDP of the present invention may range from 50 to 500 nm, preferably from 100 to 400 nm, or more preferably from 163 to 350 nm.

Preferably, the total amount of the multi-stage acrylic copolymer and nucleating agent present in the RDP is from 40 to 99.9 wt. %, based on the total dry weight of the RDP. More preferably, the total amount of the multi-stage acrylic copolymer and nucleating is from 50 to 96.9 wt. %, based on the total dry weight of the RDP.

The RDP of the present invention may be formed by drying an aqueous mixture comprising the carboxyl group containing multi-stage acrylic copolymer and, if required, additional colloidal stabilizer and/or any optional components e.g. an anti-caking agent. Preferably, drying the aqueous mixture comprises spray drying. Spray drying can be carried out in customary spray drying plants, with atomization being carried out by means of single-fluid, two-fluid or multifluid nozzles or a rotary disc atomizer. In general, air, nitrogen or nitrogen enriched air may be employed as the drying gas, the inlet temperature of the drying gas generally not exceeding 200° C., preferably from 110° C. to 180° C., more preferably from 130° C. to 170° C. The outlet temperature may generally be from 45° C. to 120° C., preferably from 60° C. to 90° C., depending on the plant, the Tg of the resin and the desired degree of drying. In one example, the viscosity of the feed to be spray-dried may be adjusted via the solids content so that a value of less than 1000 mPas (Brookfield viscosity at 20 rpm and 23° C.), preferably less than 250 mPas, is obtained. The solids content of the admixture to be spray-dried may generally be from 25% to 60% by weight, preferably from 35% to 50% by weight, based on the total weight of the dispersion.

RDPs of the present invention have a variety of uses. The RDPs may be used as functional additives in a wide range variety of compositions such as in non-cementitious exterior finishing compositions such as, for example, a textured and, optionally, pigmented topcoat formulation for use in an exterior insulation and finish system (EIFS).

According to a further aspect, the present invention provides non-cementitious dry mix formulations for use in exterior finishing compositions comprising, based on the total weight of the dry mix formulation, from 40 to 80 wt. % of an aggregate material and from 3 to 30 wt. % of an RDP according to the first aspect of the present invention.

As used herein, "aggregate materials" refers to any material that imparts surface texture to a dried layer of the resulting exterior finishing composition, preferably, a sand, or more preferably a silicon dioxide containing sand. Preferably, the aggregate material is present in an amount of from 50 to 70 wt. %, based on dry weight of the formulation.

Preferably, the dry mix formulation further includes a pigment. The pigment may be an inorganic pigment, e.g. a titanium, aluminium, cobalt, copper, iron, chromium, lead, manganese, titanium or tin pigment, or the pigment may be an organic pigment, e.g. carbon black. Preferably, the pigment is an inorganic pigment, more preferably a titanium pigment and most preferably titanium dioxide ($TiO_2$). When present, the dry mix formulation preferably comprises such pigment(s) in an amount no more than 10 wt. %, preferably from 1 to 10 wt. %, based on the total weight of the dry mix formulation.

Optionally, the dry mix formulation of the present invention further comprises one or more filler or extender particles. Such filler or extender particles are included to provide opacity to the finishing composition. If present, the filler or extender particles are preferably included in an amount of from 2 to 30 wt. %, more preferably from 4 to 25 wt. %, even more preferably from 10 to 15 wt. %, based on the dry weight of the formulation. Preferred filler or extender products are selected from clay, calcium carbonate, silicates, particularly alumina silicates, talcs, dolomite, silicate minerals, and combinations thereof. Most preferably, the filler or extender particles are selected from calcium carbonate, silicates and combinations thereof.

According to a further aspect, the present invention provides a non-cementitious exterior finishing composition comprising the dry mix formulation of the invention and water. Preferably, when the finishing composition comprises one or more pigment(s), the composition has a total pigment volume concentration (PVC) content of from 60 to 100%. For the avoidance of doubt, PVC is calculated using the formula recited below, wherein $V_{pigment}$ represents the volume of pigment within the composition, and $V_{binder}$ represents the volume of polymeric binder within the composition $$PVC\ (\%) = V_{pigment}/(V_{pigment} + V_{binder}) \times 100$$

Preferably, the exterior finishing composition comprises from 10 to 30 wt. %, based on the total weight of the exterior finishing composition, of water. Preferably, the exterior finishing composition is a topcoat in an exterior insulation and finish system (EIFS).

In addition to the components recited above, the exterior finishing composition of the invention may comprise one or more further components. In preferred embodiments, the exterior finishing composition further comprises an additional, i.e. non-RDP derived, colloidal stabilizer. In such embodiments, the colloidal stabilizer is preferably present in an amount, based on total polymer solids, of no more than 20 wt. %, more preferably no more than 5 wt. %. Suitable and preferred colloidal stabilizers are as indicated above. Preferably, the exterior finishing composition further comprises a hydrophobic agent.

More preferably, the hydrophobic agent is selected from ester or sulfonate compounds comprising a linear or branched alkyl group comprising at least 8, more preferably at least 12 carbon atoms, an aryl or an arylakyl group or salts, preferably sodium, zinc, calcium, potassium or ammonium salts, thereof. Still more preferably the hydrophobic agent is selected from sodium lauryl sulfate (SLS), sodium oleate, sodium stearate, sodium dodecylbenzenesulfonate or a zinc, calcium, potassium or ammonium salt thereof. Still more preferably, the hydrophobic compound is SLS. In such embodiments, the hydrophobic agent is preferably present in an amount, based on total polymer solids, of from 0.1 to 10 wt. %, more preferably from 0.5 to 7.5 wt. %, based on the total dry weight of the composition.

The exterior finishing compositions and dry mix formulations of the present invention may, in addition to the components identified above, comprise one or more conventional additives such as, for example, rheology modifiers, thickeners, defoamers, adhesion promoters, UV stabilizers like benzophenone, preservatives, biocides, mildewcides and/or anti-freeze agents, all of which are well known in the art and are available from commercial sources.

According to a further aspect, the present invention provides a method of coating a surface with an exterior finishing composition, said method comprising: applying on said surface an exterior finishing composition according to the third aspect of the invention; and drying or allowing to dry said exterior finishing composition.

Some embodiments of the invention shall now be further described by way of exemplification only. All ratios, parts and percentages are expressed by dry weight unless otherwise specified, and all components are of good commercial quality unless otherwise specified.

As shown below in Table 2, the following materials were used to prepare the multi-stage acrylic copolymers in the Examples:

TABLE 2

| Name | Composition and Source |
| --- | --- |
| MOWIOL ™ 4-88 Solution | polyvinyl alcohol (86.7 to 88.7% hydrolysed, $M_W$ ~31K (20 wt. %) [2] |
| PLURONIC ™ L-31 | ethylene oxide-propylene oxide-ethylene oxide block copolymer[4] |
| TEXANOL ™ | 2,2,4-trimethyl-1,3-pentanediol monoisobutyrate[3] |
| TRITON ™,[1] X-15 | ethylene glycol octylphenyl ether; HLB = 1.5 |
| VERSENE ™, | EDTA, tetrasodium salt[1] |
| WINNOFIL ™-S | $CaCO_3$ coated with stearic acid[5] |

[1] Dow Chemical Co., Midland, MI;
[2] Kuraray America, Inc., Houston, TX;
[3] Eastman Chemical, Kingsport, TN;
[4] BASF Ag Florham Park, NJ;
[5] Solvay Advanced Functional Materials, Houston, TX

EXAMPLE 1

Polymer Synthesis

Emulsions A to R were each made by an inverse two-stage process in which alkali soluble resin was prepared prior to polymerization of the inner stage copolymer in the presence of the alkali soluble resin. Emulsions A, C, D, J and K were made using thermal initiators, in the presence or absence of polyfunctional or crosslinking monomers and/or chain transfer agents etc. whereas Emulsions B, E to I and L to R were made using redox initiators.

Emulsion A: To a 5 L reactor equipped with a mechanical stirrer, thermocouple, condenser and a stainless steel feed ports was charged with 473 g of deionized (DI) water and warmed to 85° C. When warm, a monomer emulsion (ME) as shown in Table 3.1 below, was transferred with a FMI (Fluid Meter Incorporated, Syosset, N.Y.) pump at its maximum rate into the reactor over ~15 minutes. An additional 35 g DI water rinse was then added to the reactor. With the reactor temperature at 50° C., three separate aqueous solutions of sodium sulfoxylate formaldehyde (SSF), tert-butylhydroperoxide (tBHP) and ferrous sulfate heptahydrate, as shown in Table 3.1 were added sequentially to the reactor. An exothermic reaction was observed within 2-3 minutes, gradually increasing to 90° C. over 15 minutes. After the temperature peaked, two aqueous chaser solutions composed of tBHP and SSF were added to the reactor to reduce residual monomer. After 10 minutes, an aliquot was taken and analysed for 372 nm (BI90 plus), 222 ppm MMA, and pH 2.39. The resulting latex was next treated with a neutralizer solution composed of aqueous solution of sodium hydroxide and calcium hydroxide to afford slightly soluble copolymer with a semi-transparent solution and a pH 11.

TABLE 3.1

| ME | Wt. (g) |
|---|---|
| DI water | 373 |
| EDTA, tetrasodium salt | 0.045 |
| sodium dodecylbenzenesulfonate (NaDBS) | 1.17 |
| Texanol | 30.6 |
| methyl methacrylate (MMA) | 240.0 |
| allyl methacrylate (ALMA) | 4.66 |
| glacial methacrylic acid (MAA) | 61.2 |
| methyl 3-mercapto propionate (MMP) | 10.69 |

| Solutions | | | | | |
|---|---|---|---|---|---|
| Activator | Wt. (g) | Initiator | Wt. (g) | Promoter | Wt. (g) |
| SSF | 3.89 | tBHP | 6.02 | FeSO$_4$—7 H$_2$O | 0.023 |
| DI Water | 37 | DI Water | 28 | DI Water | 21 |

| Chase Activator | | | |
|---|---|---|---|
| SSF | 0.44 | tBHP | 0.63 |
| DI Water | 15 | DI Water | 24 |

| Neutralizer (Stage 1) | Wt. (g) |
|---|---|
| DI Water | 151 |
| sodium hydroxide (50 wt. % water) | 36.9 |
| calcium hydroxide | 17.5 |

After 15 minutes, as shown in Table 3.2, below, an aqueous ammonium persulfate (APS) initiator solution was added followed the gradual addition of monomer emulsion 2 (ME2) and an aqueous ammonium persulfate solution (cofeed initiator solution) at 30.5 and 2.34 g/min, respectively. Total feed time was 90 minutes and the reaction temperature was maintained between 84-86° C. After these feeds were completed, 35 g of DI Water was used to rinse the ME2 to the reactor and 10 g of DI Water was used to rinse the cofeed initiator to the reactor. While these rinses were being fed to the reactor, the latex was cooled to 75° C. An aqueous solution of tBHP and SSF were feed to the latex over 20 minutes while cooling the latex to 50° C. At 50° C., a biocide (ROCIMA BT2S, Dow Chemical, Midland, Mich.) was added to the latex and the latex was isolated and analysed: 49.20% Solids; pH 7.06: 164 nm average particle size (BI90 plus), 17 ppm MMA and 44 ppm BA.

Emulsion B: This emulsion was prepared in accordance with the procedure described for Emulsion A, except a redox initiated process was conducted. Specifically, the 5 L reactor was charged with 473 g of deionized (DI) water (~22° C.) and warmed. At 60° C. the monomer emulsion (ME) as shown in Table 3.3, below, was transferred at the maximum pump rate into the reactor over ~15 minutes. An additional 35 g DI water rinse was then added to the reactor. With the reactor temperature at ~38° C., three separate aqueous solutions of sodium sulfoxylate formaldehyde (SSF), tert-butylhydroperoxide (tBHP) and ferrous sulfate heptahydrate, as shown in Table 3.3, below, were added sequentially to the reactor. An exothermic reaction was observed within 2-3 minutes, gradually increasing to 67° C. over 15 minutes. After the temperature peaked, two aqueous chaser solutions composed of tBHP and SSF were added to the reactor to reduce residual monomer. After 10 minutes, an aliquot was taken and analysed for 372 nm (BI90 plus), 222 ppm MMA, and pH 2.39. The resulting latex was next treated with a neutralizer solution composed of aqueous solution of sodium hydroxide and calcium hydroxide to afford slightly soluble copolymer with a semi-transparent solution and a pH 11.

TABLE 3.2

| | Wt. (g) |
|---|---|
| ME2 | |
| DI water | 537.8 |
| Mowiol ™ 4-88 solution (20% wt) | 221.6 |
| sodium lauryl sulfate (SLS) | 12.2 |
| butyl acrylate (BA) | 1011.6 |
| MMA | 668.4 |
| Initiator | |
| APS | 2.23 |
| DI WATER | 28 |
| Cofeed Initiator Solution | |
| APS | 10.49 |
| DI water | 177 |

TABLE 3.3

| ME | Wt. (g) |
|---|---|
| DI water | 373 |
| EDTA, tetrasodium salt | 0.045 |
| sodium dodecylbenzenesulfonate (NaDBS) | 1.17 |
| Texanol | 30.6 |
| methyl methacrylate (MMA) | 240.0 |
| allyl methacrylate (ALMA) | 4.66 |
| glacial methacrylic acid (MAA) | 61.2 |
| methyl 3-mercapto propionate (MMP) | 10.69 |

| Solutions | | | | | |
|---|---|---|---|---|---|
| Activator | Wt. (g) | Initiator | Wt. (g) | Promoter | Wt. (g) |
| SSF | 3.89 | tBHP | 6.02 | FeSO$_4$—7 H$_2$O | 0.023 |
| DI Water | 37 | DI Water | 28 | DI Water | 21 |

| Chase Activator | | | |
|---|---|---|---|
| SSF | 0.44 | tBHP | 0.63 |
| DI Water | 15 | DI Water | 24 |

| Neutralizer (Stage 1) | Wt. (g) |
|---|---|
| DI Water | 151 |
| sodium hydroxide (50 wt. % water) | 36.9 |
| calcium hydroxide | 17.5 |

After 15 minutes, as shown in Table 3.4, below, an aqueous ammonium persulfate (APS) initiator solution was added followed the gradual addition of monomer emulsion 2 (ME2), an aqueous ammonium persulfate solution (cofeed initiator solution) and a sodium metabisulfite (NaMBS) solution (cofeed activator solution) at 26.9, 1.42 and 1.51 g/min, respectively. Total feed time was 90 minutes and the reaction temperature was maintained between 64-68° C. After these feeds were completed, 35 g of DI Water was used to rinse the ME2 to the reactor and 10 g of DI Water was used to rinse the cofeed initiator to the reactor. An aqueous solution of tBHP and SSF were feed to the latex over 20 minutes while cooling the latex to 50° C. At 50° C., 138.5 g of an aqueous solution of Mowiol 4-88 (20% wt) was added to the latex. Next a biocide (ROCIMA BT2S, Dow Chemical, Midland, Mich.) was added to the latex and the latex was isolated and analysed: 49.91% Solids; pH 7.58: 141 nm average particle size (BI90 plus), 21 ppm MMA and 214 ppm BA.

TABLE 3.4

| | Wt. (g) |
|---|---|
| ME2 | |
| DI water | 593.2 |
| Mowiol ™ 4-88 solution (20% wt) | 138.5 |
| sodium lauryl sulfate (SLS) | 12.2 |
| butyl acrylate (BA) | 1011.6 |
| MMA | 667.7 |
| Initiator | |
| APS | 5.00 |
| DI Water | 28 |
| Cofeed Initiator Solution | |
| APS | 7.71 |
| DI water | 120 |
| Cofeed activator Solution | |
| NaMBS | 15.95 |
| DI Water | 120 |

Emulsion C: This emulsion was prepared emulsion in accordance with the procedure described for Emulsion A, except that the BA quantity was decreased to 834.5 g and the MMA quantity was increased to 834.5 g. Latex data: 48.71% Solids; pH 7.22: 188 nm average particle size (BI90 plus), 3 ppm MMA and 8 ppm BA.

Emulsion D: This emulsion was prepared in accordance with the procedure described for Emulsion A, except that the BA quantity was decreased to 961.7 g and the MMA quantity was increased to 718.5 g. Latex data: 48.85% Solids; pH 7.12: 190 nm average particle size (BI90 plus), 2 ppm MMA and 11 ppm BA.

Emulsion E: This emulsion was prepared in accordance with the procedure described for Emulsion B, except that the 8.5 g of allyl methacrylate (ALMA) was added to ME2 after 80% of ME2 had been fed. Latex data: 48.66% Solids; pH 7.28: 134 nm average particle size (BI90 plus), 2 ppm MMA and 30 ppm BA.

Emulsion F: This emulsion was prepared in accordance with the procedure described for Emulsion B, except that the 8.5 g of trimethoxysilylpropyl methacrylate (MATS) was added to ME2 after 80% of ME2 had been fed. Latex data: 47.94% Solids; 156 nm average particle size (BI90 plus), 3 ppm MMA and 138 ppm BA.

Emulsion G: Was prepared in accordance with the procedure described for Emulsion B, except that the weight ratio of ME1 to ME2 was changed from 3:17 to 1:9 and 8.5 g of allyl methacrylate (ALMA) was added to ME2 after 80% of ME2 had been fed. Specifically, the 5 L reactor was with 473 g of DI water and warmed to 60° C. When warm, a monomer emulsion (MED as shown in Table 3.5 was transferred at the maximum pump rate into the reactor over ~15 minutes. An additional 35 g DI water rinse was then added to the reactor. With the reactor temperature at 38° C., three separate aqueous solutions of sodium sulfoxylate formaldehyde (SSF), tert-butylhydroperoxide (tBHP) and ferrous sulfate heptahydrate, as shown in Table 3.5 were added sequentially to the reactor. An exothermic reaction was observed within 2-3 minutes, gradually increasing to 67° C. over 15 minutes. After the temperature peaked, two aqueous chaser solutions composed of tBHP and SSF were added to the reactor to reduce residual monomer. After 10 minutes, an aliquot was taken and analysed for 372 nm (BI90 plus), 222 ppm MMA, and pH 2.39. The resulting latex was next treated with a neutralizer solution composed of aqueous solution of sodium hydroxide and calcium hydroxide to afford slightly soluble copolymer with a semi-transparent solution and a pH 11.

TABLE 3.5

| ME | Wt. (g) |
|---|---|
| DI water | 244 |
| EDTA, tetrasodium salt | 0.029 |
| sodium dodecylbenzenesulfonate (NaDBS) | 0.76 |
| Texanol | 20.0 |
| methyl methacrylate (MMA) | 157.0 |
| allyl methacrylate (ALMA) | 3.05 |
| glacial methacrylic acid (MAA) | 40.0 |
| methyl 3-mercapto propionate (MMP) | 6.99 |

| Solutions | | | | | |
|---|---|---|---|---|---|
| Activator | Wt. (g) | Initiator | Wt. (g) | Promoter | Wt. (g) |
| SSF | 2.54 | tBHP | 3.94 | FeSO$_4$—7 H$_2$O | 0.023 |
| DI Water | 26 | DI Water | 20 | DI Water | 10 |

| Chase Activator | | | |
|---|---|---|---|
| SSF | 0.44 | tBHP | 0.63 |
| DI Water | 15 | DI Water | 24 |

| Neutralizer (Stage 1) | Wt. (g) |
|---|---|
| DI Water | 104 |
| sodium hydroxide (50 wt. % water) | 24.2 |
| calcium hydroxide | 11.5 |

After 15 minutes, as shown in Table 3.6, below, an aqueous ammonium persulfate (APS) initiator solution was added followed the gradual addition of monomer emulsion 2 (ME2), an aqueous ammonium persulfate solution (cofeed initiator solution) and a sodium metabisulfite (NaMBS) solution (cofeed activator solution) at 26.0, 1.33 and 1.33 g/min, respectively. Total feed time was 90 minutes and the reaction temperature was maintained between 64-68° C. After 80% of ME2 had been fed, 8.5 g of ALMA was added to ME2 with agitation. After these feeds were completed, 35 g of DI Water was used to rinse the ME2 to the reactor and 10 g of DI Water was used to rinse the cofeed initiator to the reactor. An aqueous solution of tBHP and SSF were feed to the latex over 20 minutes while cooling the latex to 50° C. At 50° C., 138.5 g of an aqueous solution of Mowiol 4-88 (20% wt) was added to the latex. Next a biocide (ROCIMA BT2S, Dow Chemical, Midland, Mich.) was added to the latex and the latex was isolated and analysed: 48.63%

Solids; pH 7.23: 174 nm average particle size (BI90 plus), Viscosity (LV#3/60 rpm): 870 cps, 3 ppm MMA and 344 ppm BA.

TABLE 3.6

| | Wt. (g) |
|---|---|
| ME2 | |
| DI water | 555.9 |
| MOWIOL ™ 4-88 solution (20% wt) | 139.8 |
| sodium lauryl sulfate (SLS) | 12.9 |
| butyl acrylate (BA) | 1030.7 |
| MMA | 672.7 |
| Initiator | |
| APS | 3.00 |
| DI Water | 28 |
| Cofeed Initiator Solution | |
| APS | 4.69 |
| DI water | 121 |
| Cofeed Initiator Solution | |
| NaMBS | 9.25 |
| DI Water | 121 |

Emulsion H: This emulsion was prepared using the procedure described for Emulsion G, except that 4.25 g of ALMA was added to ME2 after 80% of ME2 had been fed. Latex data: 48.44% Solids; 154 nm average particle size (BI90 plus), 2 ppm MMA and 42 ppm BA.

Emulsion I: This emulsion was prepared using the procedure described for Emulsion G, except 8.5 g of MATS was added to ME2. Latex data: 48.44% Solids; 154 nm average particle size (BI90 plus), 2 ppm MMA and 42 ppm BA.

Emulsion J: This emulsion was prepared using the procedure described for Emulsion A, except that the weight ratio of ME1 to ME2 was changed from 15:85 to 10:90 and ALMA was introduced to ME2. Specifically, the 5 L reactor charged with 473 g of deionized (DI) water and warmed to 85° C. When warm, a monomer emulsion (ME1) as shown in Table 3.7, below, was transferred at the maximum pump rate into the reactor over ~15 minutes. An additional 35 g DI water rinse was then added to the reactor. With the reactor temperature at 50° C., three separate aqueous solutions of sodium sulfoxylate formaldehyde (SSF), tert-butylhydroperoxide (tBHP) and ferrous sulfate heptahydrate, as shown in Table 3.7 were added sequentially to the reactor. An exothermic reaction was observed within 2-3 minutes, gradually increasing to 90° C. over 15 minutes. After the temperature peaked, two aqueous chaser solutions composed of tBHP and SSF were added to the reactor to reduce residual monomer. After 10 minutes, an aliquot was taken and analysed for 372 nm (BI90 plus), 222 ppm MMA, and pH 2.39. The resulting latex was next treated with a neutralizer solution composed of aqueous solution of sodium hydroxide and calcium hydroxide to afford slightly soluble copolymer with a semi-transparent solution and a pH 11.

After 15 minutes, as shown in Table 3.8, below, an aqueous ammonium persulfate (APS) initiator solution was added followed the gradual addition of monomer emulsion 2 (ME2), an aqueous ammonium persulfate solution (cofeed initiator solution) and a sodium metabisulfite (NaMBS) solution (cofeed activator solution) at 26.0, 1.33 and 1.33 g/min, respectively. Total feed time was 90 minutes and the reaction temperature was maintained between 64-68° C. After 40% of ME2 had been fed, 4.25 g of ALMA was added to ME2 with agitation. After these feeds were completed, 35 g of DI Water was used to rinse the ME2 to the reactor and 10 g of DI Water was used to rinse the cofeed initiator to the reactor. An aqueous solution of tBHP and SSF were feed to the latex over 20 minutes while cooling the latex to 50° C. At 50° C., 138.5 g of an aqueous solution of Mowiol 4-88 (20% wt) was added to the latex. Next a biocide (ROCIMA BT2S, Dow Chemical, Midland, Mich.) was added to the latex and the latex was isolated and analysed: 49.66% Solids; pH 7.20: 154 nm average particle size (BI90 plus), 2 ppm MMA and 15 ppm BA.

TABLE 3.7

| ME | Wt. (g) |
|---|---|
| DI water | 244 |
| EDTA, tetrasodium salt | 0.029 |
| sodium dodecylbenzenesulfonate (NaDBS) | 0.76 |
| Texanol | 20.0 |
| methyl methacrylate (MMA) | 157.0 |
| allyl methacrylate (ALMA) | 3.05 |
| glacial methacrylic acid (MAA) | 40.0 |
| methyl 3-mercapto propionate (MMP) | 6.99 |

| Solutions | | | | | |
|---|---|---|---|---|---|
| Activator | Wt. (g) | Initiator | Wt. (g) | Promoter | Wt. (g) |
| SSF | 2.54 | tBHP | 3.94 | FeSO$_4$—7 H$_2$O | 0.023 |
| DI Water | 26 | DI Water | 20 | DI Water | 10 |
| Chase Activator | | | | | |
| SSF | 0.44 | tBHP | 0.63 | | |
| DI Water | 15 | DI Water | 24 | | |

| Neutralizer (Stage 1) | Wt. (g) |
|---|---|
| DI Water | 104 |
| sodium hydroxide (50 wt. % water) | 24.2 |
| calcium hydroxide | 11.5 |

TABLE 3.8

| | Wt. (g) |
|---|---|
| ME2 | |
| DI water | 555.9 |
| MOWIOL ™ 4-88 solution (20% wt) | 139.8 |
| sodium lauryl sulfate (SLS) | 12.9 |
| butyl acrylate (BA) | 1030.7 |
| MMA | 672.7 |
| Initiator | |
| APS | 2.23 |
| DI Water | 28 |
| Cofeed Initiator Solution | |
| APS | 10.49 |
| DI water | 169 |

Emulsion K: This emulsion was prepared using the procedure described for Emulsion A, except that 8.5 g of MATS was added to ME2 after 80% of ME2 had been fed. Latex data: 48.16% Solids; 172 nm average particle size (BI90 plus), 9 ppm MMA and 11 ppm BA.

Emulsion L: This emulsion was prepared using the procedure described for Emulsion B, except that the ME2 composition was changed to that presented in Table 3.9, below. Latex data: 48.44% Solids; 159 nm average particle size (BI90 plus), pH: 7.32, 4 ppm MMA and 17 ppm BA.

TABLE 3.9

| ME2 | Wt. (g) |
| --- | --- |
| DI water | 555.9 |
| MOWIOL ™ 4-88 solution (20% wt) | 139.8 |
| sodium lauryl sulfate (SLS) | 12.9 |
| butyl acrylate (BA) | 927.3 |
| MMA | 600.8 |
| Acetoacetyl Ethyl Methacrylate (AAEM) | 166.9 |

Emulsion M: This emulsion was prepared in accordance with the procedure described for Emulsion B, except that 4.25 g of butylene glycol dimethacrylate (BGDMA) was added to ME2 after 80% of ME2 had been fed. Latex data: 46.97% Solids; 106 nm average particle size (BI90 plus), pH: 7.38, 36 ppm MMA and 81 ppm BA.

Emulsion N: This emulsion was prepared in accordance with the procedure described for Emulsion G, except that a monomer emulsion seed (ME2 seed) and nDDM was added to ME2. Specifically, the reactor was charged with 481 g of deionized (DI) water (22° C.). A monomer emulsion (MED as shown in Table 3.10, below, was transferred at the maximum pump rate into the reactor over ~15 minutes. An additional 35 g DI water rinse was then added to the reactor. With the reactor temperature at 22° C., three separate aqueous solutions of sodium sulfoxylate formaldehyde (SSF), tert-butylhydroperoxide (tBHP) and ferrous sulfate heptahydrate, as shown in Table 3.10 were added sequentially to the reactor. An exothermic reaction was observed within 2-3 minutes, gradually increasing to 51° C. over 18 minutes. After the temperature peaked, two aqueous chaser solutions composed of tBHP and SSF were added to the reactor to reduce residual monomer. After 10 minutes, the resulting latex was next treated with a neutralizer solution composed of aqueous solution of sodium hydroxide and calcium hydroxide to afford slightly soluble copolymer with a semi-transparent solution and a pH 11.

After 15 minutes and the reactor temperature at 51° C., 232 g of ME2, as shown in Table 3.11, below, was added to the reactor followed by the addition of an aqueous ammonium persulfate (APS) initiator solution and an aqueous sodium metabisulfite solution (NaMBS). An exothermic reaction was observed within 2 minutes, gradually increasing to 68° C. in 9 minutes. After the temperature peaked, the gradual addition of monomer emulsion 2 (ME2), an aqueous ammonium persulfate solution (cofeed initiator solution) and a sodium metabisulfite (NaMBS) solution (cofeed activator solution) were added at 12.8, 0.74 and 0.744 g/min, respectively. After 10 minutes, these feeds were increased to 19.2, 1.11 and 1.11 g/min, respectively. After an additional 10 minutes, these feeds were increased to 25.6, 1.48 and 1.48 g/min, respectively. Total feed time was 90 minutes and the reaction temperature was maintained between 64-68° C. After 80% of ME2 had been fed, 8.5 g of ALMA was added to ME2 with agitation. After these feeds were completed, 35 g of DI Water was used to rinse the ME2 to the reactor and 10 g of DI Water was used to rinse the cofeed initiator to the reactor. An aqueous solution of tBHP and SSF were feed to the latex over 20 minutes while cooling the latex to 50° C. At 50° C., 138.5 g of an aqueous solution of Mowiol 4-88 (20% wt) was added to the latex. Next a biocide (ROCIMA BT2S, Dow Chemical, Midland, Mich.) was added to the latex and the latex was isolated and analysed: 48.25% Solids; pH 7.14: 280 nm average particle size (BI90 plus), Viscosity (LV#3/60 rpm): 184 cps, 6 ppm MMA and 59 ppm BA.

TABLE 3.10

| ME | Wt. (g) |
| --- | --- |
| DI water | 244 |
| EDTA, tetrasodium salt | 0.029 |
| sodium dodecylbenzenesulfonate (NaDBS) | 0.76 |
| Texanol | 20.0 |
| methyl methacrylate (MMA) | 157.0 |
| allyl methacrylate (ALMA) | 3.05 |
| glacial methacrylic acid (MAA) | 40.0 |
| methyl 3-mercapto propionate (MMP) | 6.99 |

| Solutions | | | | | |
| --- | --- | --- | --- | --- | --- |
| Activator | Wt. (g) | Initiator | Wt. (g) | Promoter | Wt. (g) |
| SSF | 2.54 | tBHP | 3.94 | FeSO$_4$—7 H$_2$O | 0.023 |
| DI Water | 26 | DI Water | 20 | DI Water | 10 |

| Chase Activator | | | |
| --- | --- | --- | --- |
| SSF | 0.44 | tBHP | 0.63 |
| DI Water | 15 | DI Water | 24 |

| Neutralizer (Stage 1) | Wt. (g) |
| --- | --- |
| DI Water | 104 |
| sodium hydroxide (50 wt. % water) | 24.2 |
| calcium hydroxide | 11.5 |

TABLE 3.11

| | Wt. (g) |
| --- | --- |
| ME2 | |
| DI water | 555.9 |
| MOWIOL ™ 4-88 solution (20% wt) | 139.8 |
| sodium lauryl sulfate (SLS) | 12.9 |
| butyl acrylate (BA) | 1030.7 |
| MMA | 672.7 |
| n-Dodecyl Mercaptan (nDDM) | 2.91 |
| Initiator | |
| APS | 3.00 |
| DI Water | 28 |
| Activator | |
| NaMBS | 2.16 |
| DI Water | 28 |
| Cofeed Initiator Solution | |
| APS | 4.69 |
| tBHP | 0.15 |
| DI water | 121 |
| Cofeed Initiator Solution | |
| NaMBS | 7.09 |
| DI Water | 121 |

Emulsion O: This emulsion was prepared in accordance with the procedure described for Emulsion N, except that 1.45 g n-dodecyl mercaptan (nDDM) was added to ME2. Latex data: 47.66% Solids; 250 nm average particle size (BI90 plus), pH: 7.20, 13 ppm MMA and 145 ppm BA.

Emulsion P: This emulsion was prepared in accordance with the procedure described for Emulsion N, except that 4.25 g 3-methyl mercaptopropionate (MMP) was added to ME2. Latex data: 47.57% Solids; 228 nm average particle size (BI90 plus), pH: 7.26, Viscosity (LV#3/60 rpm): 74 cps, 6 ppm MMA and 37 ppm BA.

Emulsion Q: This emulsion was prepared in accordance with the procedure described for Emulsion N, except that 1.73 g 3-methyl mercaptopropionate (MMP) was added to ME2. Latex data: 47.96% Solids; 181 nm average particle size (BI90 plus), pH: 7.23, Viscosity (LV#3/60 rpm): 102 cps, 4 ppm MMA and 223 ppm BA.

Emulsion R: This emulsion was prepared in accordance with the procedure described for Emulsion N, except that 0.86 g 3-methyl mercaptopropionate (MMP) was added to ME2. Latex data 47.90% Solids; 136 nm average particle size (BI90 plus), pH: 7.17, 3 ppm MMA and 300 ppm BA.

EXAMPLE 2

RDP Synthesis

As indicated in Table 5, 1000 g of the Emulsions indicated in Example 1 were treated with an aqueous slurry composed of 6.25 g of calcium hydroxide and 365 g of water at ambient temperature, to give an emulsion having a pH 10-11 and a solids content of ~35%. The neutralized emulsion was then spray dried using a Niro Atomizer Spray Dryer (GEA Process Engineering Inc., Columbia, Md.) laboratory spray dryer equipped with a nozzle (SU4 or SU5 from Spray Systems Company, Wheaton, Ill.). Spray drying conditions, with tolerances for uncertainty were as shown in Table 4, below.

TABLE 4

| Temperature | | Air Flow | Latex | Anti-Caking Aid |
|---|---|---|---|---|
| Inlet | Outlet | | | |
| 170-180° C. | 62-64° C. | 6.0-6.2 kg/cm$^2$ | 55-65 g/min | 2.9-3.5 g/min |

Unless specified, an anti-caking aid was not used for all examples. The resulting free-flowing powders were evaluated for recovery and redispersibility by resistance to sedimentation as described below.

Recovery, i.e. the percent of powder recovered vs. the total amount of dry polymer, anti-caking aid and protective colloid spray dried: An acceptable level of recovery is >75 wt. % of the total weight of solids put into the dryer, and, preferably, 90 wt. % but it is dependent on cyclone efficiency.

Sedimentation: Each powder was redispersed by mixing 50 g equal weight of powder and water for 30 minutes using a standard stainless steel agitator and an IKW RW 20 Digital Stirrer (Wilmington, N.C.) at 400 rpm. The resulting paste was let down with additional water, 1 part paste to 90 parts water. Sedimentation indicates the dispersion stability of the aqueous redispersed powder where optimum sedimentation is 0 mm after 24 hours. Sedimentation analysis is conducted using a 0.5 mm diameter×45 cm in length burette modified with a flat base containing graduation in mm vs. mL. Preferably, the level of sedimentation is ≤30 mm

TABLE 5

| Example | Emulsion | Recovery | wt. % H$_2$O | % ACA | Sedimentation |
|---|---|---|---|---|---|
| 2.1 | A | 90.0% | 2.38% | None | 10 mm 24 hr |
| 2.2 | B | 86.3% | 2.55% | 13.76% Kaolin | 10 mm 24 hr |
| 2.3 | C | 82% | 2.09% | None | 10 mm 24 hr |
| 2.4 | D | 96.0% | 2.39% | None | 15 mm 24 hr |
| 2.5 | E | 77.1% | 2.58% | None | 21 mm 24 hr |
| 2.6 | F | 96.0% | 2.39% | None | 15 mm 24 hr |
| 2.7 | G | 85.7% | 1.74% | 13.21% Kaolin | 12 mm 24 hr |
| 2.8 | H | 84.1% | 1.82% | 12.80% Kaolin | 9 mm 24 hr |
| 2.9 | I | 81.8% | 2.10% | None | 40 mm 24 hr |
| 2.10 | J | 86.8% | 1.69% | 15.26% Kaolin | 23 mm 24 hr |
| 2.11 | K | 84.6% | 2.30% | None | 22 mm 24 hr |
| 2.12 | L | 92.5% | 2.31% | None | 9 mm 24 hr |
| 2.13 | M | 79.80% | 2.25% | None | 34 mm 24 hr |
| 2.14 | N | 83.0% | 2.38% | 17.04% Kaolin | 22 mm 24 hr |
| 2.15 | O | 83.4% | 2.01% | 12.49% | 25 mm 24 hr |
| 2.16 | P | 84.7% | 2.24% | 15.34% Kaolin | 15 mm 24 hr |
| 2.17 | Q | 84.9% | 2.21% | 15.11% Kaolin | 9 mm 24 hr |
| 2.18 | R | 83.5% | 2.15% | 16.58% Kaolin | 15 mm 24 hr |

EXAMPLE 3

Exterior Finishing Compositions

The performance of textured paint compositions of the present invention were evaluated by comparing EIFS topcoat formulations comprising various RDPs of Example 2. For each test, a pigmented and textured paint composition having a PVC of 70% or 79% was prepared and analysed. The specifics of each formulation were as follows:

70% PVC EIFS Formulation: A dry mix formulation was prepared comprising: 7.98 wt. % #15 Sand; 64.83 wt. % 50-30 Sand; 5.57 wt. % Duramite™ (a CaCO$_3$ extender available from Imerys Pigments, Inc.); 0.60 wt. % Metolat™ P 871 (a neopentyl glycol-based anti shrink coalescent available from Munzing, Germany); 0.12 wt. % Walocel™ 40000 PFV (a cellulose ether thickener available from the Dow Chemical Company); 0.30 wt. % Attagel 50™ (a clay-based rheology modifier available from BASF); 0.08 wt. % of #6 Denier MiniFibers, ~0.6 cm cut; 0.30 wt. % Agitan™ P 804 (a defoamer available from Munzing, Germany); 4.49 wt. % Ti-Pure™ R-960 (a TiO$_2$ pigment available from Dupont); 0.30 wt. % Bioban™ IBPC 100 (a biocide available from the Dow Chemical Company); 0.20 wt. % of potassium tripolyphosphate dispersant and 15.24 wt. % of an RDP identified above. The textured paint compositions were prepared by admixing the dry mix formulations with an additional 19.84%, based on the dry weight of the formulation, of water at the point of use.

79% PVC EIFS Formulation: In each test, a dry mix formulation was prepared comprising: 7.52 wt. % #15 Sand; 61.07 wt. % 50-30 Sand; 15.36 wt. % Duramite™ (a CaCO$_3$ extender available from Imerys Pigments, Inc.); 0.56 wt. % Metolat™ P 871 (a neopentyl glycol-based anti shrink coalescent available from Munzing, Germany); 0.11 wt. % WALOCEL™ 40000 PFV (a cellulose ether thickener available from the Dow Chemical Company); 0.28 wt. % Attagel 50™ (a clay-based rheology modifier available from BASF); 0.08 wt. % of #6 Denier MiniFibers, ~0.6 cm cut; 0.28 wt. % Agitan™ P 804 (a defoamer available from Munzing, Germany); 4.23 wt. % Ti-Pure™ R-960 (a TiO$_2$ pigment available from Dupont); 0.28 wt. % Bioban™ IBPC 100 (a biocide available from the Dow Chemical Company); 0.19 wt. % of potassium tripolyphosphate dispersant and 10.04 wt. % of an RDP identified above. The textured paint compositions were prepared by admixing the dry mix formulations with an additional 18.69%, based on the dry weight of the formulation, of water at the point of use.

The Dirt Pick-up Resistance (DPUR), i.e. the ability of exterior finishing compositions to resist surface discolouration due to the accumulation of air and water borne dirt, and the wet abrasion resistance of the textured paint formulations were analysed as follows:

Dirt Pick-Up Resistance (DPUR): This test measures the amount of dirt which is permanently embedded into the surface of the finishing composition following exposure to simulated dirt in a laboratory environment. The textured and pigmented finishing compositions described above were trowelled to 0.16 cm thickness onto an aluminium panel and allowed to dry for seven days at a constant temperature of 25° C. and a relative humidity of 50%. The coated panel is then exposed to ultraviolet radiation in a QUV unit (The Q-Panel Company) for 24 hours after which the panels are removed and allowed to equilibrate for 4 hours at 25° C. and 50% relative humidity before initiating the DPUR test.

A red iron oxide slurry (MAPICO™ 422) was applied by brush to the surface of the coated panels which were then allowed to dry for three hours at 25° C. and a relative humidity of 50% after which the panels were washed under running water whilst rubbing lightly and evenly with a small amount of liquid hand soap and a nylon scrubbing brush until no further iron oxide can be removed. The washed coated panel is then dried for at least two hours at a temperature of 25° C. and a relative humidity of 50%. The reflectance readings of the washed coated panel and an untested clean section were measured using a Gardner Colorgard II 45° Reflectometer (Gardner/Neotec Instrument Division, Silver Springs, Md.). Three clean and three dirty readings were taken for each sample, with the average of the three readings used to calculated % reflectance retained using the following formula:

$$\% \text{ Reflectance Retained} = 100 \times \frac{\text{Reflectance of Treated Sample}}{\text{Reflectance of Untreated Sample}}$$

The % reflectance retained is used to characterise the DPUR of exterior finishing compositions, with a high % reflectance indicating good resistance to dirt pickup.

Wet Abrasion Resistance: This test measures the resistance of an exterior finishing composition to abrasion and provides a measure of early film formation. The textured and pigmented finishing compositions described above were applied with a trowel to a wet thickness of 1.6 mm onto a 16.5 cm×43.2 cm vinyl sheet. The coated sheet was dried either at 75° C. and a relative humidity of 50% for 24 hours or at 40° C. and a relative humidity of 70% for a period of 48 hours. After which, uncoated vinyl from the edges of the sample are trimmed. The initial weight of the coated sheet (A) is recorded to the nearest 0.01 gram before it is taped onto an aluminium plate with the coated side up and placed on an abrasion tester (Gardener Straight Line Tester, Gardener Labs). 10 g of an abrasive scrub medium made in conformance to ASTM Method D2486 and D3450 (SC-2, the Lenexa Company) and 10 g of water was evenly applied onto a brush which is mounted onto the abrasion tester with the bristles touching the coated sheet. The abrasion tester is started and 2000 cycles were completed, with 10 g SC-2 and 10 g water being re-applied to the brush after completion of every 500 cycles. The coated sheet is removed from the tested and rinsed under warm water. The coated sheet is dried for at least 12 hours at 25° C. and 50% relative humidity. After drying, the final weight of the coated sheet (B) is determined to the nearest 0.01 gram. Finally, the uncoated vinyl sheet is cut into three test strips with identical dimensions as the coated sheet and weighed to the nearest 0.01 gram. The weight of the uncoated vinyl sheet (C) is an average of these three weights. The % weight loss of the coated sheets is determined according the following equation, with the recorded result representing the average of at least two tested samples:

$$\% \text{ Weight Loss} = 100 \times \frac{A - B}{A - C}$$

A low value of % weight loss indicates good initial film formation and resistance to abrasion.

The DPUR results of various textured paint formulations are summarised in Tables 6.1 to 6.5 below. In Tables 6.1 and 6.2, no polyfunctional monomer or chain transfer agent was used.

TABLE 6.1

Redox vs. Thermal initiated polymerisation

| RDP (Example no.) | Tg (° C.) | ASR:core | Polymer-isation process | POST ADDITIVE Anti-caking agent | DPUR 70% PVC | 79% PVC |
|---|---|---|---|---|---|---|
| 2.1 | 6 | 15:85 | Thermal | Kaolin | 70.1 | 80.2 |
| 2.2 | 6 | 15:85 | Redox | Kaolin | 59.9 | 88.3 |

TABLE 6.2

Copolymer inner stage Tg

| RDP (Example no.) | Tg (° C.) | ASR:core | Polymer-isation process | POST ADDITIVE Anti-caking agent | DPUR 70% PVC | 79% PVC |
|---|---|---|---|---|---|---|
| 2.3 | 17 | 15:85 | Thermal | Kaolin |  | 70.8 |
| 2.4 | 11 | 15:85 | Thermal | Kaolin |  | 73.8 |
| 2.1 | 6 | 15:85 | Thermal | Kaolin | 70.1 | 80.2 |
| 2.2 | 6 | 15:85 | Redox | Kaolin | 59.9 | 88.3 |

TABLE 6.3

Polyfunctional Monomers within the copolymer inner stage

| RDP Example | Tg (° C.) | ASR:core | Polymerisation process | Polyfunctional monomer | Chain transfer agent | POST ADDITIVE Anti-caking agent | DPUR 70% PVC | 79% PVC |
|---|---|---|---|---|---|---|---|---|
| 2.2 | 6 | 15:85 | Redox | — | — | Kaolin | 59.9 | 88.3 |
| 2.5 | 6 | 15:85 | Redox | 0.5 wt. % ALMA | — | Kaolin | 57.1 |  |
| 2.6 | 6 | 15:85 | Redox | 0.5 wt. % MATS | — | Kaolin | 63.9 | 59.3 |

TABLE 6.4

Weight ratio of alkali-soluble resin outer stage to inner stage(s)

| RDP (Example no.) | Tg (° C.) | ASR:core | Polymerisation process | Polyfunctional monomer | Chain transfer agent | POST ADDITIVE Anti-caking agent | DPUR 70% PVC | DPUR 79% PVC |
|---|---|---|---|---|---|---|---|---|
| 2.5 | 6 | 15:85 | Redox | 0.5 wt. % ALMA | — | Kaolin | 57.1 | |
| 2.7 | 6 | 10:90 | Redox | 0.5 wt. % ALMA | — | Kaolin | 60.1 | 59.2 |

TABLE 6.5

Additional hydrophobic agent

| RDP (Example no.) | Tg (° C.) | ASR:core | Polymerisation process | Polyfunctional monomer OR Chain transfer agent | POST ADDITIVES Anti-caking agent | POST ADDITIVES Hydrophobic agent | DPUR 70% PVC | DPUR 79% PVC |
|---|---|---|---|---|---|---|---|---|
| 2.3 | 17 | 15:85 | Thermal | — | Kaolin | — | 70.1 | |
| 2.3 | 17 | 15:85 | Thermal | — | Kaolin | 6 wt. % SLS* | 73.2 | |

*SLS = sodium lauryl sulphate

In order to compare the DPUR performance of the textured paints of the present invention with conventional textured paints, analogous paint formulations were prepared comprising commercially available RDPs, namely DRYCRYL™ DP-2903 powder (a 100% acrylic RDP having a Tg of +10° C.), ELOTEX™ WR8600 powder (a multistage cationic polymer comprising a butyl acrylate/methyl methacrylate copolymer (Tg −2° C.) core stage and a cationic amine containing shell stage made according to the process described in U.S. Pat. No. 7,674,860) and ELOTEX' FLEX8300 powder (an acrylic (co)polymer RDP manufactured according to the process described in U.S. Pat. No. 7,674,860), or a polymer latex, such as RHOPLEX™ EI-2000 polymer (a 100% acrylic polymer latex having a Tg of +12° C.) which is known to provide good DPUR performance in EIFS topcoat formulations. The DPUR results of these comparative textured paint formulations are summarised in Tables 6.6 below:

TABLE 6.6

Comparative DPUR results

| Polymer binder | DPUR 70% PVC | DPUR 79% PVC |
|---|---|---|
| EI-2000[1] polymer | 37.8 | 34.6 |
| DP-2903[1] powder | 51.8 | 52.0 |

TABLE 6.6-continued

Comparative DPUR results

| Polymer binder | DPUR 70% PVC | DPUR 79% PVC |
|---|---|---|
| WR8600[2] powder | 33.6 | 35.4 |
| FLEX8300 ™,[2] powder | 38.3 | 44.4 |

[1]The Dow Chemical Company, Midland, MI; EI-2000 powder is a 100% acrylic polymer latex having a Tg of +12° C.; DP-2903 powder is a 100% acrylic RDP having a Tg of +10° C.

[2]AkzoNobel Functional Chemicals Elotex AG, Switzerland. WR 8600 is a multistage cationic polymer comprising a butyl acrylate/methyl methacrylate copolymer (Tg −2° C.) core stage and a cationic amine containing shell stage made according to the process described in U.S. Pat. No. 7,674,860; FLEX8300 ™ is an acrylic (co)polymer RDP manufactured according to the process described in U.S. Pat. No. 7,674,860.

These results indicate that the textured paint formulations of the present invention provide improved DPUR in comparison to conventional textured paint formulations comprising acrylic latex powders and, preferably, acrylic latexes.

The Wet Abrasion Resistance ("SCRUB") results of 70% PVC textured paint formulations are summarised in Tables 7.1 to 7.5 below:

TABLE 7.1

Redox vs. Thermal initiated polymerisation
(No Chain transfer Agent was used in any of these Examples)

| RDP (Example no.) | Tg (° C.) | ASR:core | Polymerisation process | Polyfunctional monomer | POST ADDITIVE Anti-caking agent | SCRUB 70° C./ 50% RH | SCRUB 40° C./ 70% RH |
|---|---|---|---|---|---|---|---|
| 2.1 | 6 | 15:85 | Thermal | — | Kaolin | 7.96 ± 2.13 | 10.93 ± 1.55 |
| 2.2 | 6 | 15:85 | Redox | — | Kaolin | 4.72 ± 0.87 | 8.23 ± 1.93 |

TABLE 7.2

Weight ratio of alkali-soluble resin outer stage to inner stage(s)
(No Chain transfer Agent was used in any of these Examples)

| RDP (Example no.) | Tg (° C.) | ASR:core | Polymerisation process | Polyfunctional monomer | POST ADDITIVE Anti-caking agent | SCRUB 70° C./ 50% RH | SCRUB 40° C./ 70% RH |
|---|---|---|---|---|---|---|---|
| 2.2 | 6 | 15:85 | Redox | — | Kaolin | 4.72 ± 0.87 | 8.23 ± 1.93 |
| 2.8 | 6 | 10:90 | Redox | 0.25 wt. % ALMA | Kaolin | 3.18 ± 0.19 | 7.08 ± 2.35 |
| 2.9 | 6 | 10:90 | Redox | — | Kaolin |  | 6.23 ± 0.69 |

TABLE 7.3

Polyfunctional Monomers within the copolymer inner stage
(No Chain transfer Agent was used in any of these Examples)

| RDP (Example no.) | Tg (° C.) | ASR:core | Polymerisation process | Polyfunctional monomer | POST ADDITIVE Anti-caking agent | SCRUB 70° C./ 50% RH | SCRUB 40° C./ 70% RH |
|---|---|---|---|---|---|---|---|
| 2.2 | 6 | 15:85 | Redox | — | Kaolin | 4.72 ± 0.87 | 8.23 ± 1.93 |
| 2.5 | 6 | 15:85 | Redox | 0.5 wt. % ALMA | Kaolin |  | 4.29 ± 0.18 |
| 2.6 | 6 | 15:85 | Redox | 0.5 wt. % MATS | Kaolin | 3.71 ± 0.16 |  |
| 2.1 | 6 | 15:85 | Thermal | — | Kaolin | 7.96 ± 2.13 | 10.93 ± 1.55 |
| 2.11 | 6 | 15:85 | Thermal | 0.5 wt. % MATS | Kaolin | 3.96 ± 0.34 |  |
| 2.2* | 6 | 15:85 | Redox | — | Kaolin |  | *15.49 ± 2.16 |
| 2.12 | 6 | 15:85 | Redox | 10 wt. % AAEM | Kaolin |  | 9.63 ± 0.67 |
| 2.13 | 6 | 15:85 | Redox | 0.5% BGDMA | Kaolin |  | 11.85 ± 1.26 |

*Scrub was tested at 40° C./85% RH

TABLE 7.4

Chain transfer agent

| RDP (Example no.) | Tg (° C.) | ASR:core | Polymerisation process | Polyfunctional monomer | Chain transfer agent | POST ADDITIVE Anti-caking agent | SCRUB 70° C./ 50% RH | SCRUB 40° C./ 70% RH |
|---|---|---|---|---|---|---|---|---|
| 2.7 | 6 | 10:90 | Redox | 0.5 wt. % ALMA | — | Kaolin |  | 4.67 ± 0.55 |
| 2.14 | 6 | 10:90 | Redox | 0.5 wt. % ALMA | 0.125 wt. % nDDM | Kaolin |  | 4.33 ± 0.47 |
| 2.15 | 6 | 10:90 | Redox | 0.5 wt. % ALMA | 0.0625 wt. % nDDM | Kaolin |  | 4.51 ± 038 |
| 2.16 | 6 | 10:90 | Redox | 0.5 wt. % ALMA | 0.25 wt. % MMP | Kaolin |  | 4.3 ± 0.12 |
| 2.17 | 6 | 10:90 | Redox | 0.5 wt. % ALMA | 0.073 wt. % MMP | Kaolin |  | 4.36 ± 0.37 |
| 2.18 | 6 | 10:90 | Redox | 0.5 wt. % ALMA | 0.05 wt. % MMP | Kaolin |  | 4.22 ± 0.36 |

TABLE 7.5

Additional hydrophobic agent
(No Chain transfer Agent was used in any of these Examples)

| RDP (Example no.) | Tg (° C.) | ASR:core | Polymerisation process | Polyfunctional monomer | POST ADDITIVE Anti-caking agent | Hydrophobic agent | SCRUB 70° C./ 50% RH |
|---|---|---|---|---|---|---|---|
| 2.7 | 6 | 10:90 | Redox | 0.5 wt. % ALMA | Kaolin | — | 9.09 ± 4.09 |
| 2.7 | 6 | 10:90 | Redox | 0.5 wt. % ALMA | Kaolin | 1.25 wt. % SLS* | 7.78 ± 0.92 |

TABLE 7.5-continued

Additional hydrophobic agent
(No Chain transfer Agent was used in any of these Examples)

| RDP (Example no.) | Tg (° C.) | ASR:core | Polymerisation process | Polyfunctional monomer | POST ADDITIVE Anti-caking agent | POST ADDITIVE Hydrophobic agent | SCRUB 70° C./ 50% RH |
|---|---|---|---|---|---|---|---|
| 2.10 | 6 | 10:90 | Thermal | 0.25 wt. % ALMA | Kaolin | — | 4.00 ± 0.18 |
| 2.10 | 6 | 10:90 | Thermal | 0.25 wt. % ALMA | Kaolin | 5.0 wt. % SLS* | 3.36 ± 0.27 |
| 2.3 | 17 | 15:85 | Thermal | — | Kaolin | — | 17.63 ± 2.21 |
| 2.3 | 17 | 15:85 | Thermal | — | Kaolin | 6.0 wt. % SLS* | 2.48 ± 0.12 |

*SLS = sodium lauryl sulphate

In order to compare the Wet Abrasion Resistance performance of the textured paints of the present invention with conventional textured paints, the comparative paint formulations identified above comprising commercially available DRYCRYL™ DP-2903, ELOTEX™ WR8600 and ELOTEX™ FLEX8300 acrylic RDPs or RHOPLEX™ EI-2000 acrylic polymer latex were subjected to identical Wet Abrasion Resistance tests to those detailed above, the results of which are summarised in Table 7.6 below:

TABLE 7.6

Comparative Wet Abrasion Resistance results

| Polymer binder | SCRUB 75° C./ 50% RH | SCRUB 40° C./ 70% RH |
|---|---|---|
| EI-2000[1] polymer | — | 3.17 ± 0.31 |
| DP-2903[1] powder | — | 23.24 ± 6.66 |
| WR8600[2] powder | — | 6.57 ± 1.44 |
| FLEX8300 ™,[2] powder | — | 17.89 ± 4.30 |

[1]The Dow Chemical Company, USA; EI-2000 is a 100% acrylic polymer latex having a Tg of +12° C.; DP-2903 is a 100% acrylic RDP having a Tg of +10° C.; and,
[2]AkzoNobel Functional Chemicals Elotex AG, Switzerland. WR 8600 is from a multistage cationic polymer comprising a butyl acrylate/methyl methacrylate copolymer (Tg −2° C.) core stage and a cationic amine containing shell stage made according to the process described in U.S. Pat. No. 7,674,860; FLEX8300 ™ is from an acrylic (co)polymer RDP manufactured according to the process described in U.S. Pat. No. 7,674,860.

The results in the Table 7.6, above, indicate that the textured paint formulations of the present invention provide acceptable wet abrasion resistance in comparison with the conventional textured paint formulations comprising acrylic latex powders and, in particular, acrylic latexes. Indeed, the paint formulations of the present invention demonstrate an improvement in wet abrasion resistance over conventional textured paint formulations comprising acrylic latex powders and, in preferred embodiments, provide a resistance comparative to that observed for textured paints prepared from liquid polymers specifically designed for use in exterior finishing compositions.

The invention claimed is:

1. A non-cementitious dry mix formulation for use in an exterior finishing composition, said dry mix formulation comprising, based on the total weight of the dry mix formulation, from 40 to 80 wt. % of an aggregate material and from 3 to 30 wt. % of a water redispersible polymer powder (RDP) comprising a carboxyl group-containing multi-stage acrylic copolymer having:

(a) an alkali-soluble resin outer stage and one or more inner stage(s);

(b) a nucleating agent having a boiling point of 150° C. to 500° C. and a water solubility of 3.5 or less; and (c) a colloidal stabilizer, wherein, when dispersed in water, the one or more inner stage comprises an acrylic (co)polymer having a glass transition temperature (Tq), calculated using the Fox equation, of from −40 to 50° C., and wherein the weight ratio of the alkali-soluble resin outer stage to the one or more inner stage(s) is from 1:19 to 2:3.

2. A non-cementitious dry mix formulation according to claim 1, further comprising one or more pigments, wherein said pigment(s) are present in an amount, based on the total weight of the dry mix formulation, of no more than 10 wt. %.

3. A non-cementitious exterior finishing composition comprising the dry mix formulation according to claim 1 and water.

4. A non-cementitious exterior finishing composition according to claim 3, wherein said dry mix formulation comprises one or more pigments in an amount, based on the dry weight of the composition, of no more than 10 wt. %, and wherein said finishing composition has a total pigment volume concentration (PVC) content of from 60 to 100%.

5. The exterior finishing composition according to claim 3, which is a topcoat in an exterior insulation and finish system (EIFS).

6. A method of forming a coating a surface with an exterior finishing composition, said method comprising:

a) applying on said surface an exterior finishing composition according to claim 5; and b) drying or allowing to dry said exterior finishing composition.

* * * * *